(12) United States Patent
Kayaba

(10) Patent No.: US 10,129,173 B2
(45) Date of Patent: Nov. 13, 2018

(54) NETWORK SYSTEM AND METHOD FOR CHANGING ACCESS RIGHTS ASSOCIATED WITH ACCOUNT IDS OF AN ACCOUNT NAME

(71) Applicant: NEC Corporation, Minato-ku, Tokyo (JP)

(72) Inventor: Seijiro Kayaba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 358 days.

(21) Appl. No.: 14/759,760

(22) PCT Filed: Jan. 15, 2014

(86) PCT No.: PCT/JP2014/000142
§ 371 (c)(1),
(2) Date: Jul. 8, 2015

(87) PCT Pub. No.: WO2014/119233
PCT Pub. Date: Aug. 7, 2014

(65) Prior Publication Data
US 2015/0350107 A1     Dec. 3, 2015

(30) Foreign Application Priority Data

Jan. 31, 2013   (JP) .................................. 2013-016834

(51) Int. Cl.
*H04L 29/08*      (2006.01)
*H04L 12/927*     (2013.01)
(Continued)

(52) U.S. Cl.
CPC ............ *H04L 47/808* (2013.01); *G06F 21/45* (2013.01); *G06F 21/604* (2013.01);
(Continued)

(58) Field of Classification Search
CPC .... G06F 21/45; G06F 21/604; G06F 21/6209; H04L 63/101; H04L 67/10; H04L 67/306; H04L 47/808
See application file for complete search history.

(56) References Cited

U.S. PATENT DOCUMENTS 5,708,812 A * 1/1998 Van Dyke ................. G06F 8/00
                                                                      707/999.009
5,768,519 A * 6/1998 Swift ................... G06F 21/6218
                                                                      707/999.009
(Continued)

FOREIGN PATENT DOCUMENTS

| CN | 1770169 A | 5/2006 |
|---|---|---|
| CN | 101729551 A | 6/2010 |

(Continued)

OTHER PUBLICATIONS

International Search Report for PCT Application No. PCT/JP2014/000142, dated Apr. 8, 2014.
(Continued)

*Primary Examiner* — Oanh Duong

(57) ABSTRACT

In an account association table the account IDs and account names of accounts created at nodes are associated and recorded. In response to an access control list change request including the account name of an account the access control entry of which is to be changed and the contents of the change, an access control list change unit retrieves an account ID recorded while being associated with the account name from the account association table and changes, in accordance with the contents of the change, an access control entry in which the retrieved account ID is recorded among account control entries in an access control list to be changed.

6 Claims, 16 Drawing Sheets

(51) Int. Cl.
*G06F 21/45* (2013.01)
*G06F 21/60* (2013.01)
*H04L 29/06* (2006.01)
*G06F 21/62* (2013.01)

(52) U.S. Cl.
CPC ........ *G06F 21/6209* (2013.01); *H04L 63/101* (2013.01); *H04L 67/10* (2013.01); *H04L 67/306* (2013.01)

(56) References Cited

U.S. PATENT DOCUMENTS

| | | | | |
|---|---|---|---|---|
| 6,032,216 | A * | 2/2000 | Schmuck | G06F 9/52 707/999.01 |
| 8,826,390 | B1 * | 9/2014 | Varda | G06F 21/6218 726/4 |
| 9,460,300 | B1 * | 10/2016 | Kissner | G06F 21/606 |
| 2005/0071641 | A1 * | 3/2005 | Basibes | G06F 21/6218 713/182 |
| 2006/0059359 | A1 | 3/2006 | Reasor et al. | |
| 2006/0101019 | A1 | 5/2006 | Nelson et al. | |
| 2006/0123472 | A1 * | 6/2006 | Schmidt | G06F 21/41 726/8 |
| 2007/0005595 | A1 | 1/2007 | Gafter | |
| 2007/0011136 | A1 | 1/2007 | Haskin et al. | |
| 2008/0077635 | A1 * | 3/2008 | Sporny | G06F 17/30206 |
| 2009/0055921 | A1 * | 2/2009 | Field | G06F 21/6236 726/14 |
| 2009/0328180 | A1 | 12/2009 | Coles et al. | |
| 2010/0199346 | A1 * | 8/2010 | Ling | H04L 63/0263 726/12 |
| 2012/0036583 | A1 | 2/2012 | Kichikawa | |
| 2012/0304313 | A1 * | 11/2012 | Mao | H04L 67/104 726/29 |
| 2013/0073854 | A1 * | 3/2013 | Patti | H04L 9/0825 713/171 |
| 2013/0091562 | A1 * | 4/2013 | Matsuzawa | G06F 21/604 726/17 |
| 2013/0125215 | A1 * | 5/2013 | London | G06F 9/4445 726/4 |

FOREIGN PATENT DOCUMENTS

| | | |
|---|---|---|
| CN | 102112990 A | 6/2011 |
| JP | 2005-128781 A | 5/2005 |
| JP | 2006-085697 A | 3/2006 |
| JP | 2010-044519 A | 2/2010 |
| JP | 2011-526387 A | 10/2011 |

OTHER PUBLICATIONS

English translation for Written opinion of PCT Application No. PCT/JP2014/000142.
"Managing Authorization and Access Control", Nov. 3, 2005, XP0055291099, URL: https://technet.microsoft.com/en-us/library/bb457115.aspx.
Extended European Search Report for EP Application No. EP14746195.8 dated Aug. 19, 2016.
Chinese Office Action for CN Application No. 201480006985.7 dated Mar. 24, 2017 with English Translation.

* cited by examiner

Fig.4A

132 ACCOUNT ASSOCIATION TABLE STORAGE UNIT

| ACCOUNT NAME | ACCOUNT ID |
|---|---|
| A | IDA1 |
| A | IDA2 |
| B | IDB1 |
| B | IDB2 |

Fig.4B

232 ACCOUNT ASSOCIATION TABLE STORAGE UNIT

| ACCOUNT NAME | ACCOUNT ID |
|---|---|
| A | IDA1 |
| A | IDA2 |
| B | IDB1 |
| B | IDB2 |

Fig.5A

| 51 | FILE NAME OF ACCESS TARGET FILE |
| 52 | ACCOUNT NAME OF ACCOUNT TO BE USED TO ACCESS FILE HAVING FILE NAME 51 |
| 53 | ACCESS CONTENTS FOR FILE MAIN BODY |

Fig.5B

| 51 | FILE NAME OF ACCESS TARGET FILE |
| 52 | ACCOUNT NAME OF ACCOUNT TO BE USED TO ACCESS FILE HAVING FILE NAME 51 |
| 53 | ACCOUNT NAME OF ACCOUNT FOR WHICH EACH CORRESPONDING ACCESS CONTROL ENTRY IS TO BE CHANGED |
| 54 | CHANGE CONTENTS FOR ACCESS CONTROL LIST |

Fig.5C

| 51 | FILE NAME OF ACCESS TARGET FILE |
| 52 | ACCOUNT NAME OF ACCOUNT TO BE USED TO ACCESS FILE HAVING FILE NAME 51 |
| 53 | ACCESS CONTENTS FOR FILE MAIN BODY |
| 54 | ACCOUNT NAME OF ACCOUNT FOR WHICH EACH CORRESPONDING ACCESS CONTROL ENTRY IS TO BE CHANGED |
| 55 | CHANGE CONTENTS FOR ACCESS CONTROL LIST |

Fig.11

ACCESS CONTROL LIST

| ACCOUNT ID | ACCESS RIGHT |
|---|---|
| IDA1 | FULL |
| IDA2 | FULL |

Fig.14A

ACCESS CONTROL LIST

| ACCOUNT ID | ACCESS RIGHT |
|---|---|
| IDA1 | ALL |
| IDA2 | ALL |
| IDB1 | READ |
| IDB2 | READ |

Fig.14B

ACCESS CONTROL LIST

| ACCOUNT ID | ACCESS RIGHT |
|---|---|
| IDA1 | ALL |
| IDA2 | ALL |
| IDB1 | WRITE |
| IDB2 | WRITE |

Fig.14C

ACCESS CONTROL LIST

| ACCOUNT ID | ACCESS RIGHT |
|---|---|
| IDA1 | ALL |
| IDA2 | ALL |

NETWORK SYSTEM AND METHOD FOR CHANGING ACCESS RIGHTS ASSOCIATED WITH ACCOUNT IDS OF AN ACCOUNT NAME

This application is a National Stage Entry of PCT/JP2014/000142 filed on Jan. 15, 2014, which claims priority from Japanese Patent Application 2013-016834 filed on Jan. 31, 2013, the contents of all of which are incorporated herein by reference, in their entirety.

TECHNICAL FIELD

The present invention relates to a network system such as a work group in which nodes individually manage user accounts, a node of the network system, an access control list change method for the network system, and a program.

BACKGROUND ART

Network systems are mainly categorized into those including domain controllers and those not including any domain controller. Large network systems including a large number of nodes generally include multiple domains, and each of the domains includes a domain controller that collectively manages user accounts. Including domain controllers enables efficient and secure management and operation of a large network system.

In contrast to the above, small network systems such as a work group including a small number of nodes do not generally include any domain controller, and individual nodes manage user accounts. In other words, in a network system (also referred to as an individual-management network system) that does not include any domain controller, each user needs to create his/her own account at each node that the user desires to access (see PTL 1, for example).

More specifically, in a network system not including any domain controller, each user needs to input an account creation request including an account name and a password to each node that the user desires to access and needs to store account information including the account name, an account ID, and the password in each node in advance. The above-mentioned account name is, for example, a character string to be used by a person for identifying the account. The above-mentioned account ID is an identifier to be used by the node for uniquely identifying the account and is generated by the node itself. The account ID is also referred to as a security identifier (SID). Even when account creation requests including the same account name and password are input to multiple respective nodes, the account IDs generated at the respective nodes are not necessarily the same since the nodes individually generate the account IDs. The account information registered as described above is used for authentication. When receiving an authentication request including an account name and a password from a node used by a user, a node compares registered account information and the information received from a terminal unit and permits access to the node itself when the matching is successful.

In order to increase the security, some network systems perform access control using an access control list (ACL) on an object such as a file or a folder (see PTL 2, for example). An access control list of a certain object includes access control entries (ACEs) in each of which the account ID and the access right of an account having permission to access the object are recorded. When an account having a certain account ID (e.g., IDX) issues a request to access the object and the access control list of the object does not include any access control entry including the account ID "IDX", the access is denied. When the access control list includes such an access request entry, a determination is further made about whether to permit access, on the basis of the access right recorded in association with the account ID "IDX" and the contents of the access request.

CITATION LIST

Patent Literature

[PTL 1] Japanese Unexamined Patent Application Publication No. 2006-85697
[PTL 2] Japanese Translation of PCT International Application Publication No. 2011-526387

SUMMARY OF INVENTION

Technical Problem

As described above, in an individual-management network system, which does not include any domain controller, the nodes individually generate account IDs for identifying an account. In access control using an access control list, the account of an access request source is identified on the basis of the account ID. In consideration of these, an individual-management network system that performs access control using an access control list has a problem that, to change the access control list of an object accessible from multiple nodes with the same account name, complex change operation is required. This problem is described below by using the network system in FIG. 16 as an example.

The network system in FIG. 16 includes multiple nodes N1 to N3 and a shared storage ST shared by the nodes N1 and N2.

The shared storage ST stores a file F accessible from the node N1 and the node N2 by a user U of the node N3 by using the account name "XYZ". The file F includes an access control list ACL and a file main body FH. The access control list ACL includes an access control entry ACE1, in which the account ID "IDN1" generated by the node N1 itself at the time of creating an account of the account name "XYZ" at the node N1 and the access right "ALL" are recorded, and an access control entry ACE2, in which the account ID "IDN2" generated by the node N2 itself at the time of creating an account of the same account name "XYZ" at the node N2 and the access right "ALL" are recorded.

An account information storage unit SA of the node N1 stores account information generated upon receipt of an account creation request including the account name "XYZ" and the password "P" from the node N3. This account information includes the account name "XYZ" and the password "P", which are included in the account creation request, and the account ID "IDN1", which is generated by the node N1 itself.

An account information storage unit SB of the node N2 stores account information generated upon receipt of an account creation request including the account name "XYZ" and the password "P" from the node N3. This account information includes the account name "XYZ" and the password "P", which are included in the account creation request, and the account ID "IDN2", which is generated by the node N2 itself.

To access the file F from the node N1 by using the account name "XYZ", the user U of the node N3 transmits an access request including, for example, the account name "XYZ" and access contents, from the node N3 to the node N1. In response to the access request, the node N1 retrieves the account ID "IDN1" recorded in association with the account name "XYZ" from the account information storage unit SA. The reason of retrieving the account ID "IDN1" here is because accounts (users) accessible to an object (the file F in this case) are managed using account IDs in the access control list ACL.

After the retrieval, the node N1 checks whether an access control entry in which the account ID "IDN1" is recorded is included in the access control list ACL of the file F. In this example, since the access control entry ACE1, in which the account ID "IDN1" is recorded, is included, the node N1 determines whether or not to permit the access to the file F, on the basis of the access right recorded in the access control entry ACE1 and the access contents in the access request. In this example, since the access right recorded in the access control entry ACE1 is "ALL", the node N1 permits the user U to access the file F.

To access the file F from the node N2 by using the account name "XYZ", the user of the node N3 transmits an access request including, for example, the account name "XYZ" and access contents, from the node N3 to the node N2. Upon receipt of the request, the node N2 carries out the same process as that carried out by the node N1, and the access to the file F is permitted.

Next, operation to be performed in order to change the access control list ACL of the file F is described. First, the user U of the node N3 transmits an access control list change request from the node N3 to the node N1, the access control list change request including identification information on the object (the file F in this example) the access control list of which is to be changed, the account name (e.g., "XYZ") of the account for which the access control list is to be changed, and change contents (e.g., change the access right to "WRITE"). In response to the request, the node N1 retrieves the account ID "IDN1", which is recorded in association with the account name "XYZ", from the account information storage unit SA. Thereafter, the node N1 changes the access right in the access control entry ACE1, in which the retrieved account ID "IDN1" is recorded, from "ALL" to "WRITE". In this state, the access rights are different between when the user U accesses the file F from the node N1 by using the account name "XYZ" and when the user U accesses the file F from the node N2 by using the same account name "XYZ".

To address this situation, the user U transmits an access control list change request that has the same contents as those of the above-described access control list change request, to the node N2. In response to the request, the same process as that described above is carried out in the node N2, and the access right in the access control entry ACE2 is changed from "ALL" to "WRITE". As described above, the access control list change request needs to be transmitted to both the node N1 and the node N2 in order that the access right would be the same in the case of access from the node N1 and in the case of access from the node N2. This requires complex operation for changing the access control list. In the case in FIG. 16, the network system includes two nodes, i.e., the nodes N1 and N2, that are accessible to the file F by using the same account name "XYZ", and hence the number of times the access control list change request is transmitted is two. However, when N nodes are included as those accessible to the file F by using the same account name "XYZ", the access control list change request needs to be transmitted N times.

In view of the above, the present invention aims to provide a network system that solves the problem of requiring complex change operation to change an access control list of an object accessible from multiple nodes by using the same account name, in the case where the network system does not include any domain controller.

Solution to Problem

A network system according to an exemplary aspect of the invention includes: a first node; a second node; and an access control list of each object shared by the first node and the second node, the access control list including an access control entry in which an account ID and an access right of an account permitted to access the object are recorded, wherein the first node comprises an account association table in which an account name and an account ID of an account created at the node itself are recorded in association with each other and in which an account name and an account ID of an account created at the second node are recorded in association with each other and an access control list change unit that, in response to an access control list change request including identification information on an object an access control list of which is to be changed, an account name of an account for which an access control entry is to be changed, and change contents, retrieves an account ID recorded in association with the account name in the access control list change request, from the account association table and changes, in accordance with the change contents, an access control entry in which the retrieved account ID is recorded and that is included in the access control list of the object indicated by the identification information.

A node according to an exemplary aspect of the invention includes: an account association table in which an account name and an account ID of an account created at the node itself are recorded in association with each other and an account name and an account ID of an account created in a different node are recorded in association with each other; and an access control list change unit that, in response to an access control list change request including identification information on an object an access control list of which is to be changed among objects shared by the node itself and the different node, an account name of an account for which an access control entry is to be changed, and change contents, retrieves an account ID recorded in association with the account name in the access control list change request, from the account association table and changes, in accordance with the change contents, an access control entry in which the retrieved account ID and an access right are recorded and that is included in the access control list of the object indicated by the identification information.

An access control list change method according to an exemplary aspect of the invention is a method for a network system including a first node, a second node, and an access control list of each object shared by the first node and the second node, the access control list including an access control entry in which an account ID and an access right of an account permitted to access the object are recorded, the access control list change method includes: in response to an access control list change request including identification information on an object an access control list of which is to be changed, an account name of an account for which an access control entry is to be changed, and change contents, the first node retrieving an account ID recorded in association with the account name in the access control list change request, from an account association table in which an account name and an account ID of an account created at the node itself are recorded in association with each other and in which an account name and an account ID of an account created at the second node are recorded in association with each other, and changing, in accordance with the change contents, an access control entry in which the retrieved account ID is recorded and that is included in the access control list of the object indicated by the identification information.

A program according to an exemplary aspect of the invention is a program causing a computer including an account association table in which an account name and an account ID of an account created in the computer itself are recorded in association with each other and an account name and an account ID of an account created in a different computer are recorded in association with each other, to function as an access control list change unit that, in response to an access control list change request including identification information on an object an access control list of which is to be changed among objects shared by the computer itself and the different computer, an account name of an account for which an access control entry is to be changed, and change contents, retrieves an account ID recorded in association with the account name in the access control list change request, from the account association table and changes, in accordance with the change contents, an access control entry in which the retrieved account ID and an access right are recorded and that is included in the access control list of the object indicated by the identification information.

Advantageous Effects of Invention

According to the present invention, it is possible to obtain the effect of facilitating change operation even in the case of changing an access control list of an object accessible from multiple nodes by using the same account name, in a network system where nodes individually manage accounts.

BRIEF DESCRIPTION OF DRAWINGS

FIG. 4A provides a table illustrating an example of contents of an account association table storage unit.

FIG. 4B provides a table illustrating an example of contents of an account association table storage unit.

FIG. 5A provides a table illustrating an example of a file access request.

FIG. 5B provides a table illustrating an example of a file access request.

FIG. 5C provides a table illustrating an example of a file access request.

FIG. 11 is a table illustrating an example of an access control list.

FIG. 14A provides a table illustrating a state where an access control list is changed.

FIG. 14B provides a table illustrating a state where an access control list is changed.

FIG. 14C provides a table illustrating a state where an access control list is changed.

DESCRIPTION OF EMBODIMENTS

Next, exemplary embodiments of the present invention are described in detail with reference to the drawings.

First Exemplary Embodiment

Figure 1:
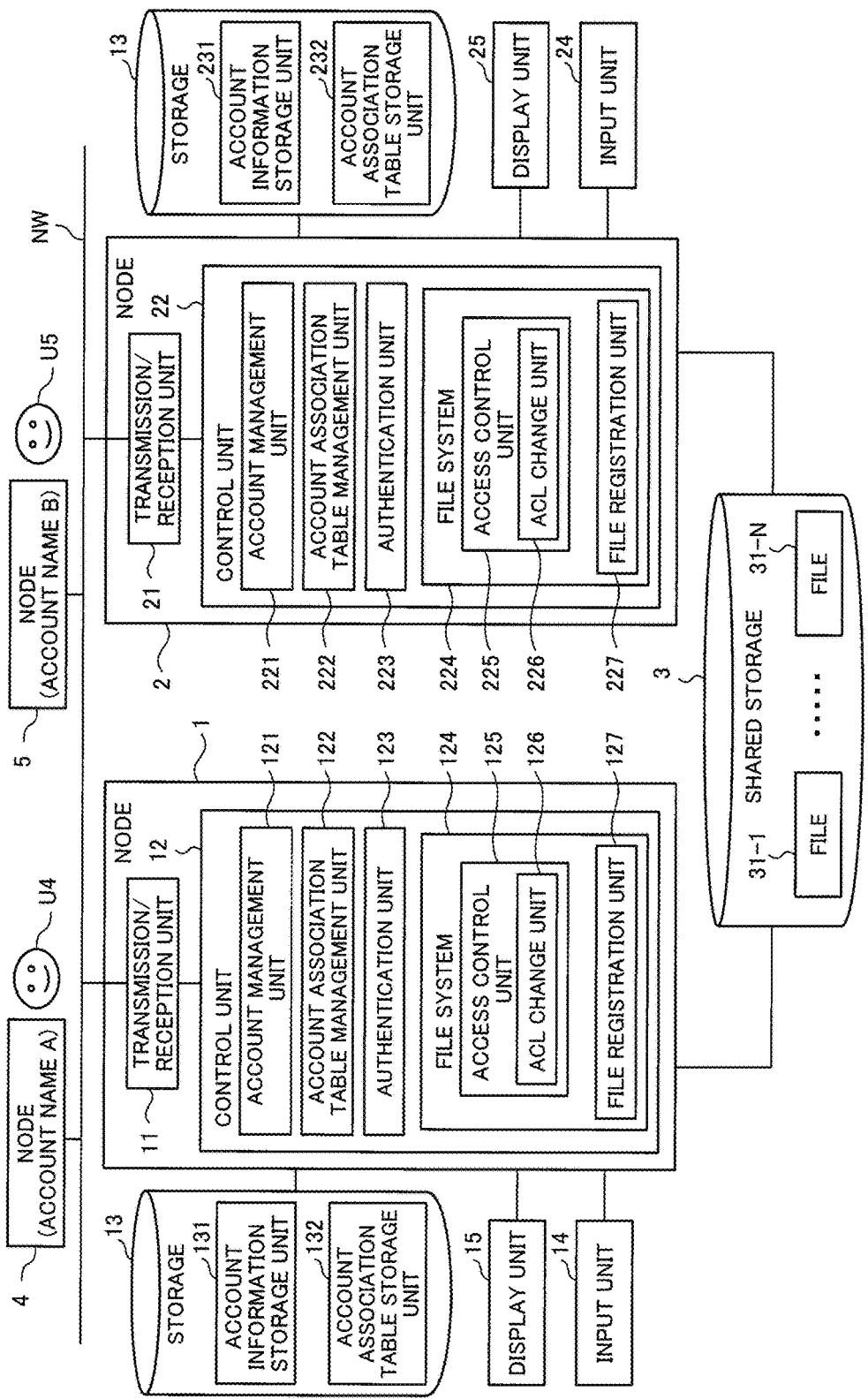
FIG. 1 is a block diagram illustrating an example of a configuration of a network system according to a first exemplary embodiment of the present invention.

Referring to FIG. 1, a network system according to a first exemplary embodiment of the present invention includes nodes 1 and 2, which function as file servers, a shared storage 3, which is accessible from the nodes 1 and 2, and nodes 4 and 5, which function as clients. The nodes 1, 2, 4, and 5 are connected to each other via a network NW. In this exemplary embodiment, for enhancing availability, the nodes 4 and 5, which function as clients, access files any of 31-1 to 31-N in the shared storage 3 from the node 1 when the node 1 is operating normally and access any of the files 31-1 to 31-N from the node 2 when the node 1 is facing failure.

Figure 2:
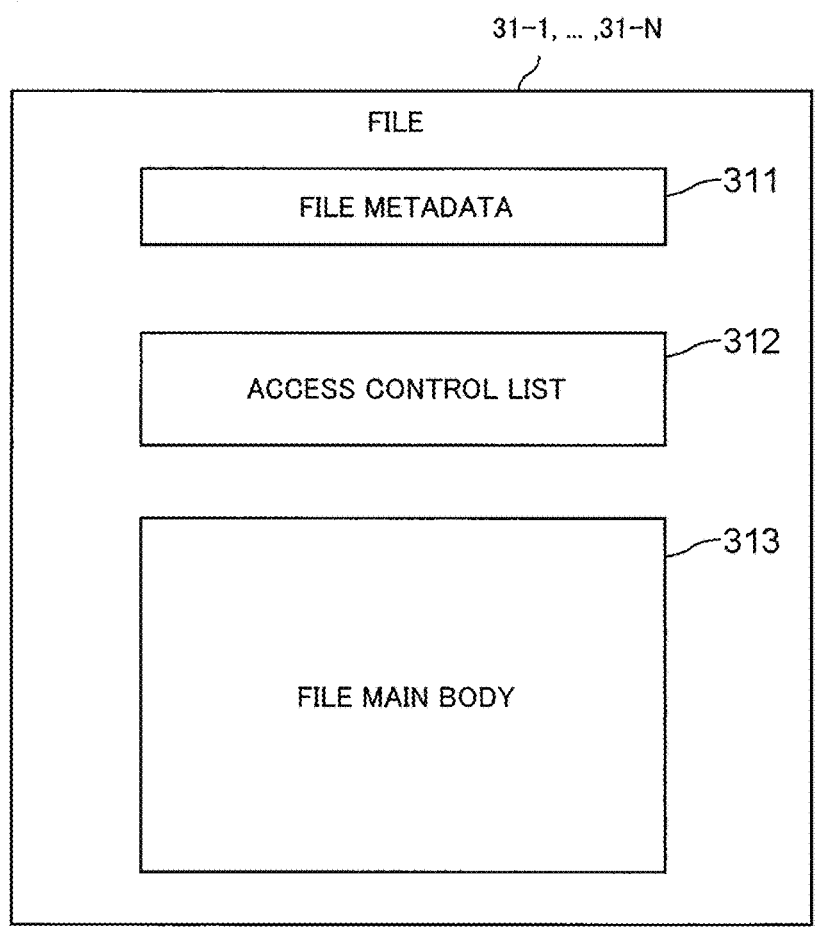
FIG. 2 is a diagram illustrating an example of a configuration of a file.

As illustrated in FIG. 2, the file 31-$i$ ($1 \leq i \leq N$) in the shared storage 3 includes a file metadata 311, an access control list 312, and a file main body 313. The file metadata 311 includes, for example, file creation time and date, the account name of a file creator, and a file name.

The nodes 1 and 2, which functions as file servers, include transmission/reception units 11, 12, control units 12, 22, storages 13, 23, input units 14, 24 such as a keyboard, and display units 15, 25 such as an LCD, respectively.

The storages 13, 23 of the nodes 1, 2 include account information storage units 131, 231 and account association table storage units 132, 232, respectively.

Figure 3A:
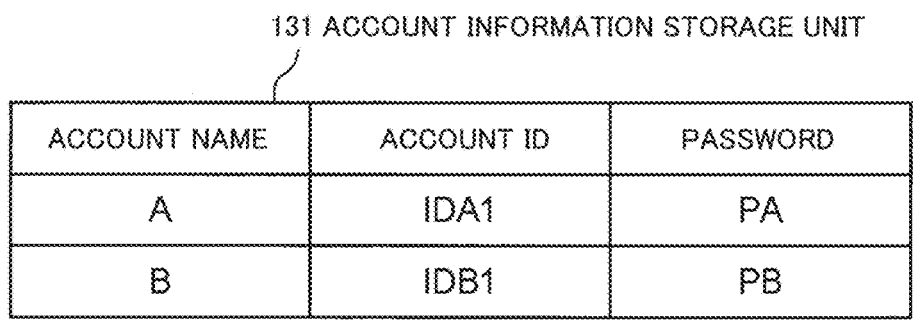
FIG. 3A provides a table illustrating an example of contents of an account information storage unit.
Figure 3B:
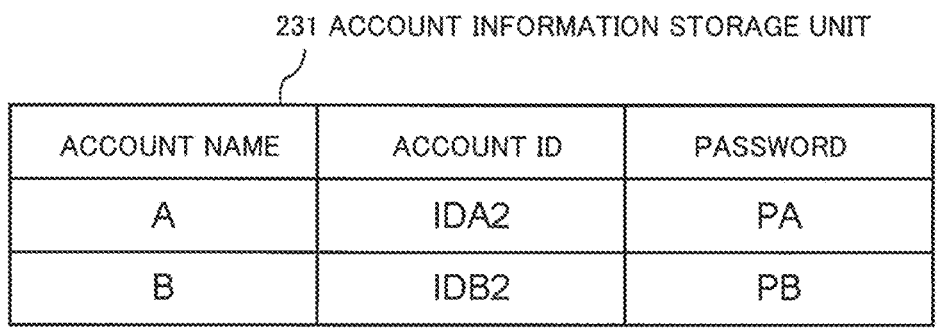
FIG. 3B provides a table illustrating an example of contents of an account information storage unit.

The account information storage unit 131 of the node 1 stores account information including the account name, the account ID, and the password of each account created at the node 1 itself. The account information storage unit 231 of the node 2 stores account information including the account name, the account ID, and the password of each account created at the node 2 itself. FIGS. 3A and 3B are tables illustrating respective examples of the contents of the account information storage units 131 and 231.

The account association table storage unit 132 of the node 1 stores an account association table in which the account name and the account ID of each account created at the node 1 itself are recorded in association with each other and the account name and the account ID of each account created at the different node 2 are recorded in association with each other. The account association table storage unit 232 of the node 2 stores an account association table in which the account name and the account ID of each account created at the node 2 itself are recorded in association with each other and the account name and the account ID of each account created by the different node 1 are recorded in association with each other. FIGS. 4A and 4B are tables illustrating respective examples of the contents of the account association table storage units 132 and 232.

Each of the transmission/reception units 11 and 21 of the respective nodes 1 and 2 has the function of transmitting and receiving data via the network NW.

The control unit 12 of the node 1 includes an account management unit 121, an account association table management unit 122, an authentication unit 123, and a file system 124, and the control unit 22 of the node 2 includes an account management unit 221, an account association table management unit 222, an authentication unit 223, and a file system 224.

The account management unit 121 of the node 1 has the function of, in response to an account creation request that is transmitted by the node 4 or the node 5 functioning as a client and that includes the account name and the password of an account to be created, generating an account ID that uniquely identifies the account at the node 1 itself, and the function of storing, in the account information storage unit 131, account information including the generated account ID, and the account name and the password in the account creation request. In addition to these, the account management unit 121 has the function of passing an account association table registration request including the generated account ID and the account name in the account creation request, to the account association table management unit 122 of the node 1 itself, and the function of transmitting the account association table registration request to the different node 2. When the account does not need to be protected with a password, no password needs to be included in the account creation request. Upon receipt of an account creation request not including any password, the account management unit 121 generates an account ID that uniquely identifies the account, and stores, in the account information storage unit 131, account information including the account ID and the account name in the account creation request.

The account management unit 221 of the node 2 has the function of, in response to an account creation request that is transmitted by the node 4 or the node 5 functioning as a client and that includes the account name and the password of an account to be created, generating an account ID that uniquely identifies the account at the node 2 itself, and the function of storing, in the account information storage unit 231, account information including the generated account ID, and the account name and the password in the account creation request. In addition to these, the account management unit 221 has the function of passing an account association table registration request including the generated account ID and the account name in the account creation request, to the account association table management unit 222 of the node 2 itself, and the function of transmitting the account association table registration request to the different node 1.

The account association table management unit 122 of the node 1 has the function of storing, in association with each other, the account name and the account ID included in the account association table registration request received from the account management unit 121 of the node 1 itself, in the account association table storage unit 132, and the function of storing, in association with each other, the account name and the account ID included in the account association table registration request received from the different node 2, in the account association table storage unit 132.

Correspondingly, the account association table management unit 222 of the node 2 has the function of storing, in association with each other, the account name and the account ID included in the account association table registration request received from the account management unit 221 of the node 2 itself, in the account association table storage unit 232, and the function of storing, in association with each other, the account name and the account ID included in the account association table registration request received from the different node 1, in the account association table storage unit 232.

The authentication unit 123 of the node 1 has the function of, upon receipt of an authentication request including an account name and a password from the node 4 or the node 5 functioning as a client, comparing the account name and the password with the account information stored in the account information storage unit 131 of the node 1 itself and permitting the use of the file system 124 when the matching is successful. The authentication unit 223 of the node 2 has the function of, upon receipt of an authentication request including an account name and a password from the node 4 or the node 5 functioning as a client, comparing the account name and the password with the account information stored in the account information storage unit 231 of the node 2 itself and permitting the use of the file system 224 when the matching is successful.

The file system 124 of the node 1 includes an access control unit 125 and a file registration unit 127, and the access control unit 125 includes an access control list change unit (ACL change unit) 126. The file system 224 of the node 2 includes an access control unit 225 and a file registration unit 227, and the access control unit 225 includes an access control list change unit (ACL change unit) 226.

The access control unit 125 of the node 1 has the following functions (1) to (4).

(1) The function of, upon receipt of a file access request from the node 4 or the node 5 functioning as a client, determining whether or not to permit the file access, by referring to the access control list of the access target file. The detailed description of the function is as follows.

File access requests in this exemplary embodiment are categorized into those requesting only a file main body as an access target, those requesting only an access control list as an access target, and those requesting both a file main body and an access control list as access targets. As illustrated in FIG. 5A, a file access request that requests only a file main body as an access target includes a file name 51 of an access target file, an account name 52 of the account to be used for accessing the file having the file name 51, and access contents 53 (such as WRITE or READ) for the file main body. As illustrated in FIG. 5B, a file access request that requests only an access control list as an access target includes the file name 51 of an access target file (file name of the file the access control list of which is to be changed) 51, the account name 52 of the account to be used for accessing the file having the file name 51, an account name 54 of the account for which each corresponding access control entry is to be changed, and change contents 55 for the access control list. The change contents 55 for the access control list include addition or deletion of an access control entry as well as change of the access right. As illustrated in FIG. 5C, a file access request requesting both a file main body and an access control list as access targets includes the file name 51 of an access target file, the account name 52 of the account to be used for accessing the file having the file name 51, the access contents 53 for the file main body, the account name 54 of the account for which each corresponding access control entry is to be changed, and the change contents 55 for the access control list.

In the case where a received file access request is that illustrated in FIG. 5(A), in which only a file main body is requested as an access target, the access control unit 125 first retrieves the account ID recorded in association with the account name 52 from the account information storage unit 131, checks whether or not the retrieved account ID is included in the access control list of the file indicated by the file name 51, and denies the access when the account ID is not included in the access control list. When the account ID is included in the access control list, the access control unit 125 further determines whether or not to permit the access, on the basis of the access right recorded in association with the retrieved account ID, and the access contents 53.

In the case where the file access request is that illustrated in FIG. 5B, in which only an access control list is requested as an access target, the access control unit 125 carries out the same process as that described above except for the part carried out when the retrieved account ID is included in the access control list of the access target file. When the retrieved account ID is included in the access control list, the access control unit 125 determines whether or not to permit the access, on the basis of the access right recorded in association with the account ID, and the change contents 55.

In the case where the file access request is that illustrated in FIG. 5C, in which both a file main body and an access control list are requested as access targets, the access control unit 125 carries out the same process as that described above except for the part carried out when the retrieved account ID is included in the access control list of the access target file. When the retrieved account ID is included in the access control list, the access control unit 125 determines whether or not to permit the access, on the basis of the access right recorded in association with the account ID, the access contents 53, and the change contents 55. Specifically, the access control unit 125 permits the access when both the process indicated by the access contents 53 and the process indicated by the change contents 55 can be performed with the recorded access right, and denies the access otherwise. The details of the function (1) are as described above.

(2) The function of, when a file access request is that illustrated in FIG. 5A, in which only a file main body is requested as an access target, carrying out a process based on the access contents 53 on the file main body of the file having the file name 51, and returning the process result to the request source.

(3) The function of, when a file access request is that illustrated in FIG. 5B, in which only an access control list is requested as an access target, instructing the access control list change unit (ACL change unit) 126 to execute a process of changing the access control list, and the function of returning the process result to the request source. The access control list change unit 126 has the function of retrieving all the account IDs recorded in association with the account name 54 from the account association table stored in the account association table storage unit 132, and the function of changing the access control entry in which each retrieved account ID is recorded among the access control entries included in the access control list of the file indicated by the file name 51, in accordance with the change contents 55. When the change contents 55 indicate addition of an access control entry, an access control entry in which the account ID and a corresponding access right are recorded is created for each retrieved account ID in the access control list. The access right is included in the change contents 55.

(4) The function of, when a file access request is that illustrated in FIG. 5C, in which both a file main body and an access control list are requested as access targets, carrying out the above processes (2) and (3) and returning the process results to the request source.

The functions of the access control unit 125 are described above. The access control unit 225 of the node 2 has the same functions as those of the access control unit 125.

The file registration unit 127 of the node 1 has the function of, upon receipt of a file registration request from the node 4 or the node 5 functioning as a client, extracting the account name of the file creator from the file metadata 311 (see FIG. 2) of the registration target file, the function of retrieving all the account IDs recorded in association with the extracted account name, from the account association table stored in the account association table storage unit 132, and the function of creating, for each retrieved account ID, an access control entry in which the account ID and the preset access right (e.g., ALL) of the file creator are recorded, in the access control list 312. The file registration unit 227 of the node 2 has the same functions as those of the file registration unit 127.

The node 1 can be implemented by a computer. In the case of implementing the node 1 by a computer, an example of the configuration is as follows: prepare a disk, a semiconductor memory, or any other recording medium in which a program for causing the computer to function as the account management unit 121, the account association table management unit 122, the authentication unit 123, and the file system 124 is recorded; and cause the computer to read the program. The computer can implement, in the computer itself, the account management unit 121, the account association table management unit 122, the authentication unit 123, and the file system 124 by controlling the operation of itself in accordance with the read program. Similarly, the node 2 can be implemented by a computer as in the case of the node 1.

Figure 6:
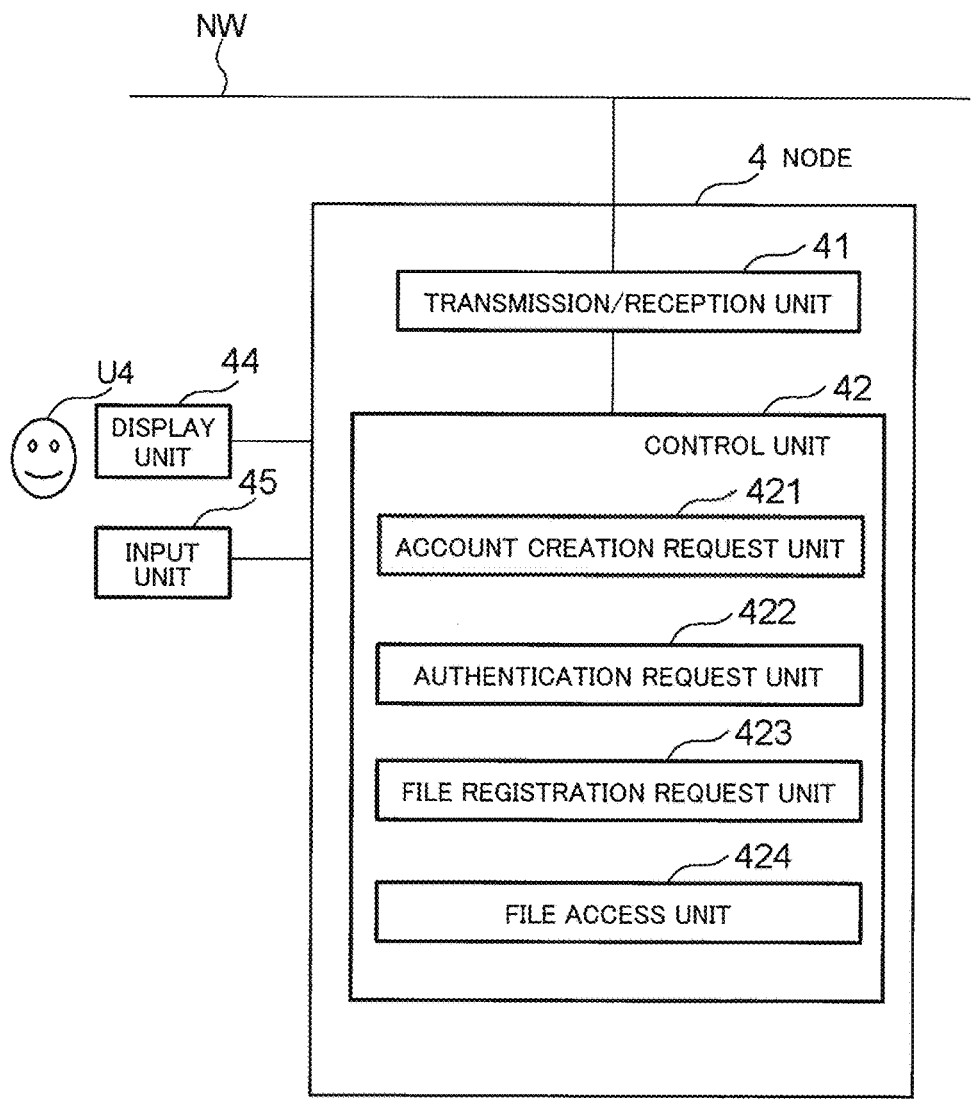
FIG. 6 is a block diagram illustrating an example of a configuration of a node functioning as a client.

Referring to FIG. 6, the node 4, which functions as a client, includes a transmission/reception unit 41, a control unit 42, an input unit 43 such as a keyboard, and a display unit 44 such as an LCD. The transmission/reception unit 41 has the function of transmitting and receiving data via the network NW.

The control unit 42 includes an account creation request unit 421, an authentication request unit 422, a file registration request unit 423, and a file access unit 424.

The account creation request unit 421 has the function of creating an account creation request including an account name and a password, in accordance with an instruction by a user U4, and transmitting the account creation request to the node specified by the user U4.

The authentication request unit 422 has the function of transmitting an authentication request including an account name and a password, to the node 1 in accordance with an instruction by the user U4. When the node 1 is facing failure, the authentication request unit 422 transmits the authentication request to the node 2.

The file registration request unit 423 has the function of transmitting a file registration request including a registration target file, to the node 1 in accordance with the instruction by the user U4. When the node 1 is facing failure, the file registration request unit 423 transmits the file registration request to the node 2.

The file access unit 424 has the function of transmitting the file access request illustrated in FIG. 5A, 5B, or 5C, to the node 1 in accordance with an instruction by the user U4. When the node 1 is facing failure, the file access unit 424 transmits the file access request to the node 2. A determination method employed to determine whether or not the node 1 is facing failure may be one determining that the node 1 is facing failure when a request to the node 1 is denied a certain number of times in succession, or one determining that the node 1 is facing failure when a signal indicating normal operation is not received from the node 1, for example.

The node 5 has the same configuration as that of the node 4. The node 4 can be implemented by a computer. In the case of implementing the node 4 by a computer, an example of the configuration is as follows: prepare a disk, a semiconductor memory, or any other recording medium in which a program for causing the computer to function as the account creation request unit 421, the authentication request unit 422, the file registration unit 423, and the file access unit 424 is recorded; and cause the computer to read the program. The computer can implement, in the computer itself, the account creation request unit 421, the authentication request unit 422, the file registration unit 423, and the file access unit 424 by controlling the operation of itself in accordance with the read program.

Next, operation in this exemplary embodiment is described in detail.

First, description is given of operation in the case where the user U4 of the node 4 creates an account with the account name "A" in each of the nodes 1 and 2.

The user U4 inputs an account creation instruction including the account name "A", the password "PA", and the destination "node 1", from the input unit 43 of the node 4. In response to the input, the account creation request unit 421 transmits an account creation request including the account name "A" and the password "PA", to the node 1 (Step S701 in FIG. 7).

Figure 7:
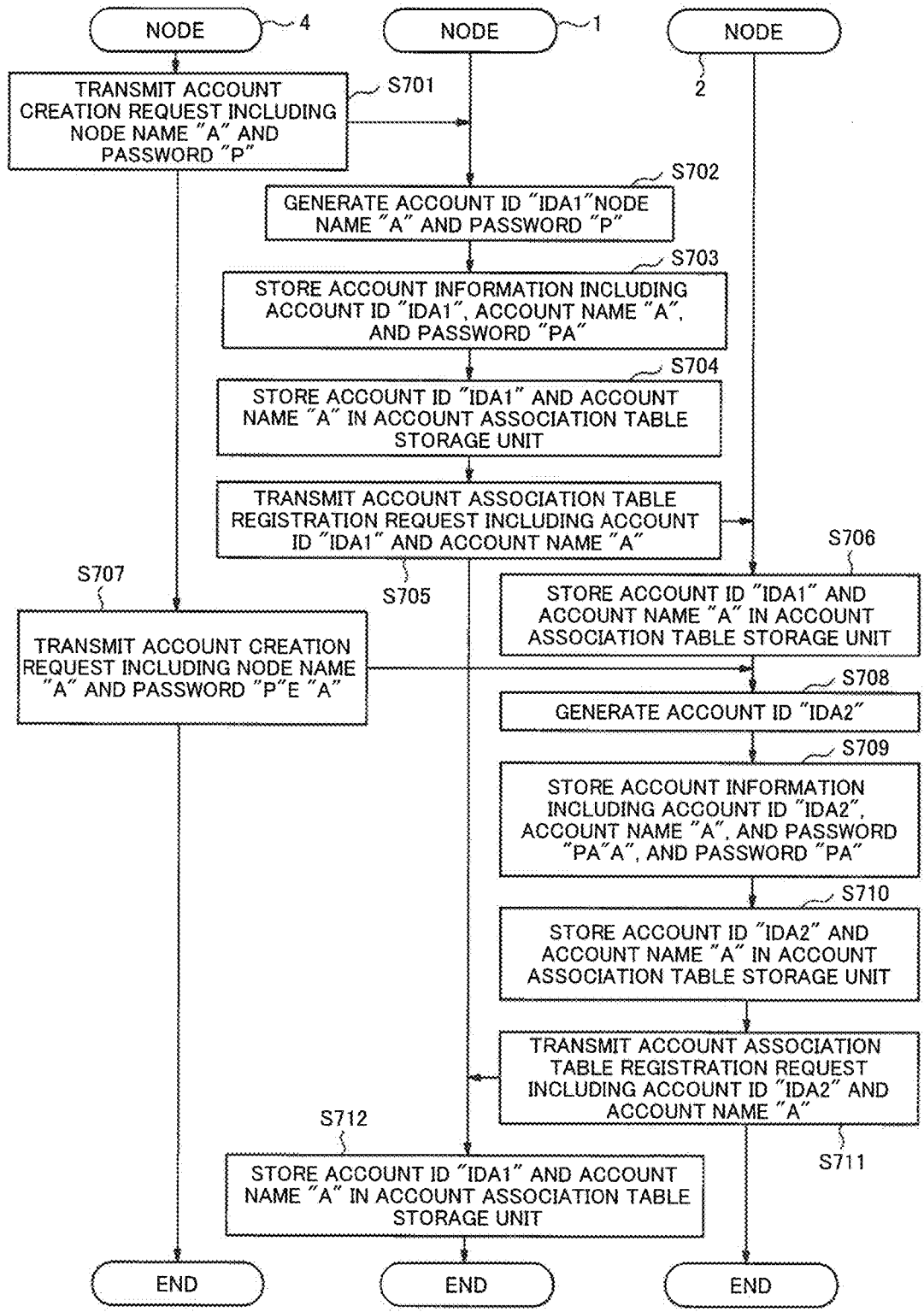
FIG. 7 is a sequence diagram illustrating operation at the time of creating accounts.
Figure 8:
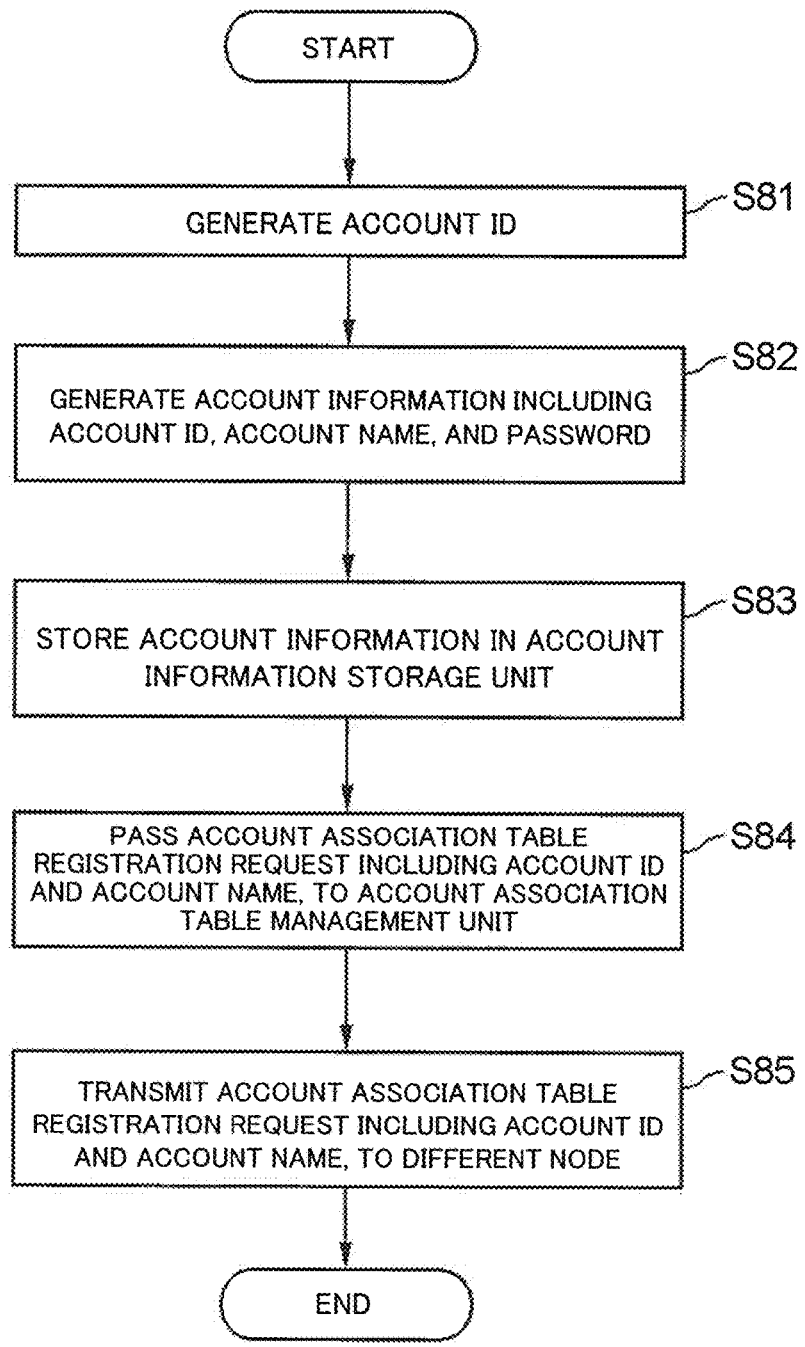
FIG. 8 is a flowchart illustrating an example of a process by an account management unit.

Upon receipt of the account creation request, the account management unit 121 of the node 1 generates the account ID "IDA1" for uniquely identifying the account at the node 1 itself (Step S702 in FIG. 7 and Step S81 in FIG. 8). Then, the account management unit 121 generates account information including the generated account ID "IDA1" as well as the account name "A" and the password "PA" in the account creation request, and stores the account information in the account information storage unit 131 (Step S703 in FIG. 7 and Steps S82 and S83 in FIG. 8).

In addition to the above, the account management unit 121 passes an account association table registration request including the account name "A" and the account ID "IDA1" to the account association table management unit 122 (Step S84 in FIG. 8). In response to the request, the account association table management unit 122 stores the account name "A" and the account ID "IDA1" in association with each other in the account association table storage unit 132 (Step S704 in FIG. 7).

After the above, the account management unit 121 transmits the account association table registration request including the account name "A" and the account ID "IDA1" to the node 2 (Step S705 in FIG. 7 and Step S85 in FIG. 8). Upon receipt of the account association table registration request from the node 1, the account association table management unit 222 of the node 2 stores the account name "A" and the account ID "IDA1" in association with each other in the account association table storage unit 232 (Step S706 in FIG. 7).

In order to create an account with the account name "A" also in the node 2, the user U4 of the node 4 inputs an account creation instruction including the account name "A", the password "PA", and the destination "node 2" from the input unit 43. In response to the input, the account creation request unit 421 transmits an account creation request including the account name "A" and the password "PA", to the node 2 (Step S707 in FIG. 7).

Upon receipt of the account creation request, the account management unit 221 of the node 2 generates the account ID "IDA2" for uniquely identifying the account at the node 2 itself (Step S708 in FIG. 7 and Step S81 in FIG. 8). Then, the account management unit 221 generates account information including the generated account ID "IDA2" as well as the account name "A" and the password "PA" in the account creation request, and stores the account information in the account information storage unit 231 (Step S709 in FIG. 7 and Steps S82 and S83 in FIG. 8). Thereafter, the account management unit 221 passes an account association table registration request including the account name "A" and the account ID "IDA2" to the account association table management unit 222 (Step S84 in FIG. 8). In response to the request, the account association table management unit 222 stores the account name "A" and the account ID "IDA2" in association with each other in the account association table storage unit 232 (Step S710 in FIG. 7).

After the above, the account management unit 221 transmits the account association table registration request including the account name "A" and the account ID "IDA2" to the node 1 (Step S711 in FIG. 7 and Step S85 in FIG. 8). Upon receipt of the account association table registration request from the node 2, the account association table management unit 122 of the node 1 stores the account name "A" and the account ID "IDA2" in association with each other in the account association table storage unit 132 (Step S712 in FIG. 7).

In the case where a user U5 of the node 5 creates an account with the account name "B" in each of the nodes 1 and 2, the same process as that described above is carried out. Through these processes, the contents of the account information storage units 131 and 231 correspond to those illustrated in FIGS. 3A and 3B and the contents of the account association table storage units 132 and 232 correspond to those illustrated in FIGS. 4A and 4B.

Next, description is given of operation in the case where the user U4 of the node 4 registers a file in the shared storage 3 by using the account created in the node 1 with the account name "A".

The user U4 inputs the account name "A" and the password "PA" to the authentication request unit 422 from the input unit 43 of the node 4. In response to the input, the authentication request unit 422 transmits an authentication request to the node 1.

Figure 9:
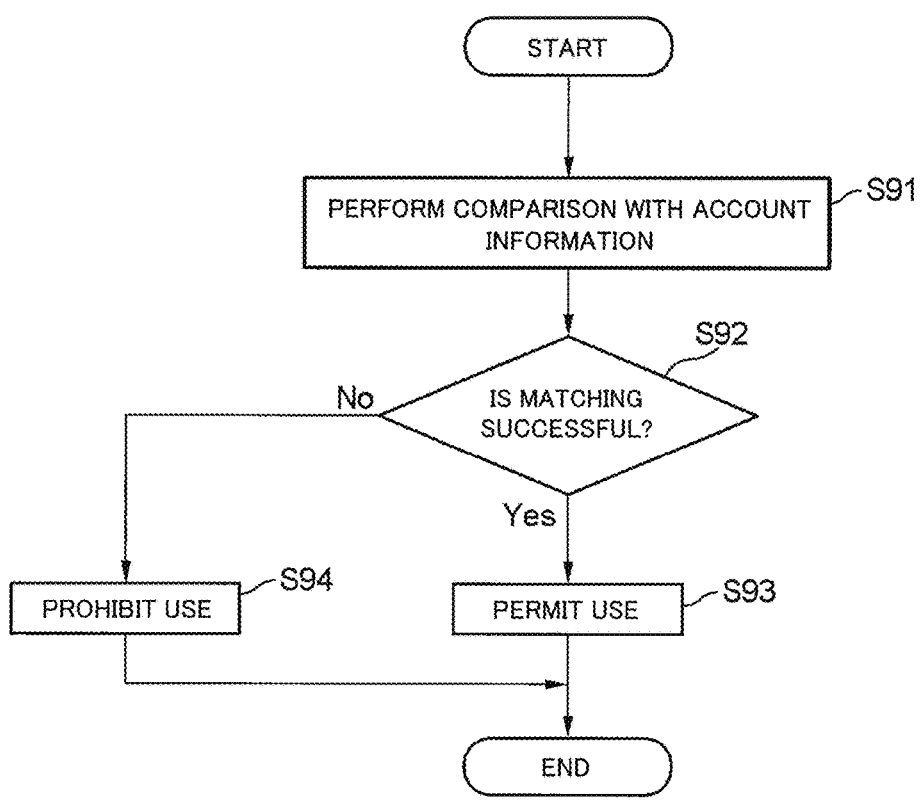
FIG. 9 is a flowchart illustrating an example of a process by an authentication unit.

The authentication unit 123 of the node 1 compares the account name "A" and the password "PA" in the authentication request received from the node 4, with the account information stored in the account information storage unit 131 (Step S91 in FIG. 9). When the matching is successful (Yes in Step S92), the authentication unit 123 permits the node 4 to use the file system 124 (Step S93); when the matching fails (No in Step S92), the authentication unit 123 denies the use (Step S94).

When the use of the file system 124 is permitted, the user U4 of the node 4 inputs a file registration instruction including, for example, the file name of a registration target file using the input unit 43. In response to the input, the file registration request unit 423 transmits a file registration request including the registration target file to the node 1.

Figure 10:
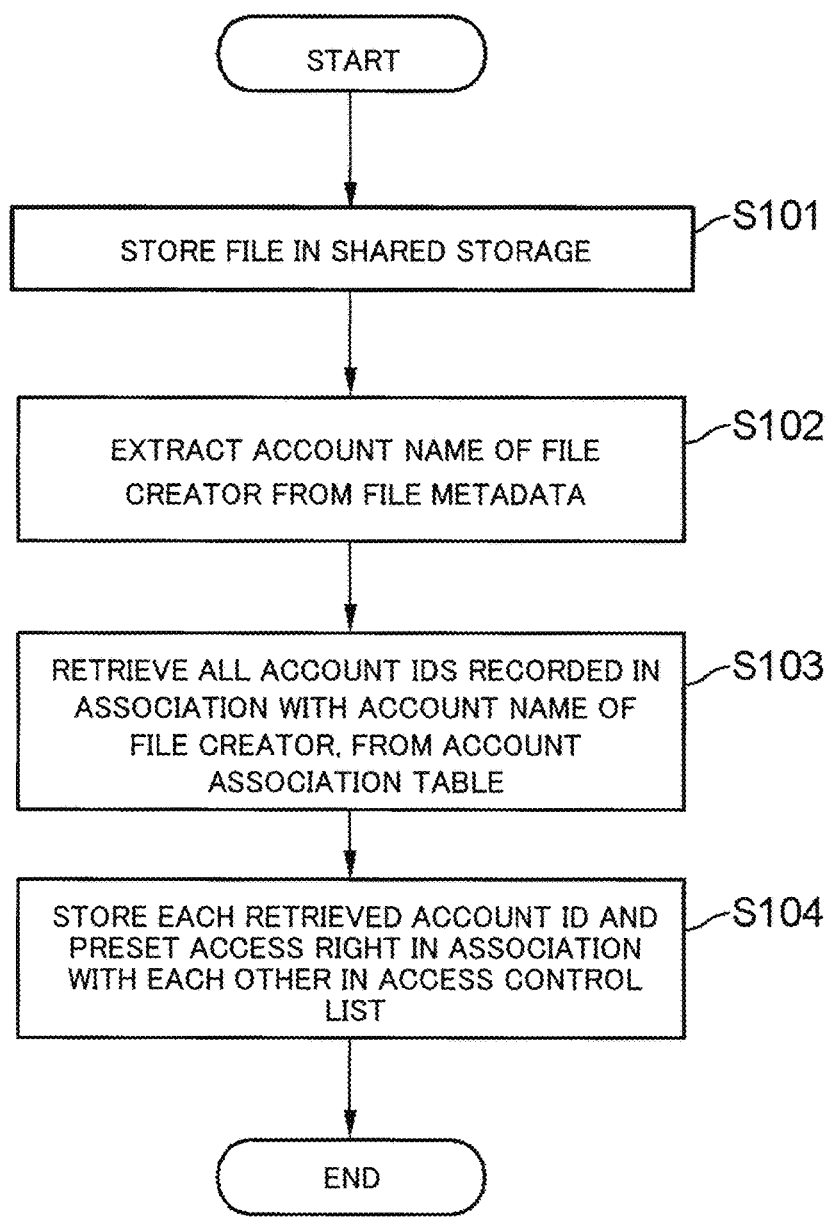
FIG. 10 is a flowchart illustrating an example of a process by a file registration unit.

Upon receipt of the file registration request from the node 4, the file registration unit 127 of the node 1 first stores the registration target file in the shared storage 3 (Step S101 in FIG. 10). Then, the file registration unit 127 extracts the account name of the file creator from the file metadata of the file and retrieves all the account IDs recorded in association with the extracted account name, from the account association table storage unit 132 (Steps S102 and S103). For example, assume that the account name of the file creator is "A" and the contents of the account association table storage unit 132 are those illustrated in FIG. 4A. In this case, the account IDs "IDA1" and "IDA2" are retrieved. Thereafter, the file registration unit 127 generates, for each retrieved account ID, an access control entry including the account ID and the preset access right (e.g., ALL) of the file creator, and stores the generated account control entry in the access control list (Step S104). Through the above process, an access control list as that presented in FIG. 11, for example, is created.

Next, description is given of operation in the case where the user U4 of the node 4 accesses a file in the shared storage 3 by using the account created in the node 1 with the account name "A".

First, the user U4 transmits an authentication request to the node 1 via the authentication request unit 422 of the node 4. When the authentication unit 123 of the node 1 permits the use of the file system 124, the file access unit 424 creates the file access request illustrated in FIG. 5A, 5B, or 5C in accordance with an instruction input from the input unit 43 by the user U4 and transmits the file access request to the node 1.

Figure 12:
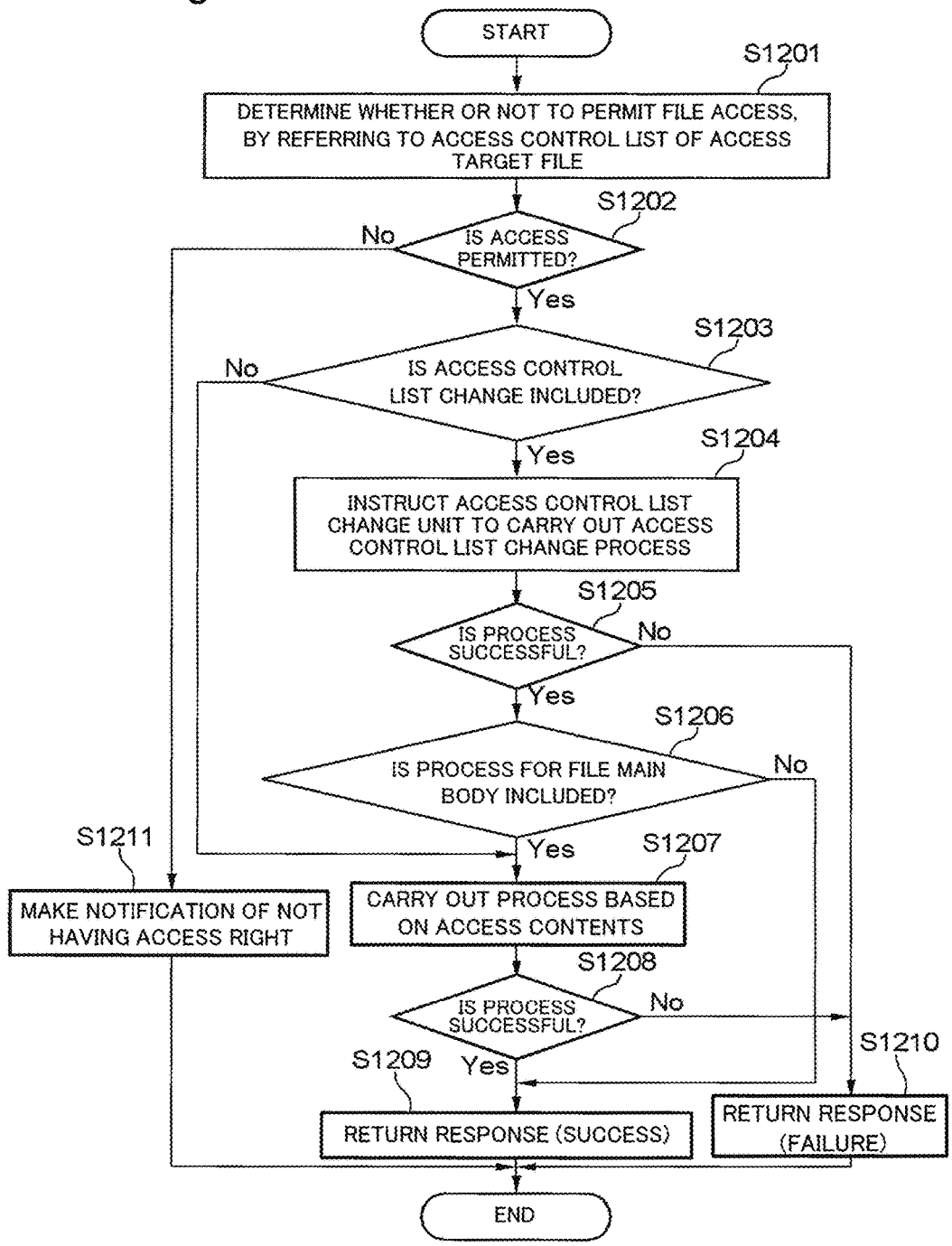
FIG. 12 is a flowchart illustrating an example of a process by an access control unit.

Upon receipt of the file access request, the access control unit 125 of the node 1 determines whether or not to permit the file access, by referring to the access control list of the file indicated by the file name 51 in the file access request (Step S1201 in FIG. 12).

When determining not to permit the access (No in Step S1202), the access control unit 125 notifies the node 4, which is the request source, of having no access right (Step S1211) and thereafter terminates the process. In contrast, when determining to permit the access (Yes in Step S1202), the access control unit 125 further determines whether or not the file access request includes change of the access control list (Step S1203). This determination is made on the basis of whether or not the "account name 54 of the account for which each corresponding access control entry is to be changed" and the "change contents 55 for the access control list" are included in the file access request.

When determining that change of the access control list is included (Yes in Step S1203), the access control unit 125 instructs the access control list change unit 126 to execute an access control list change process (Step S1204).

Figure 13:
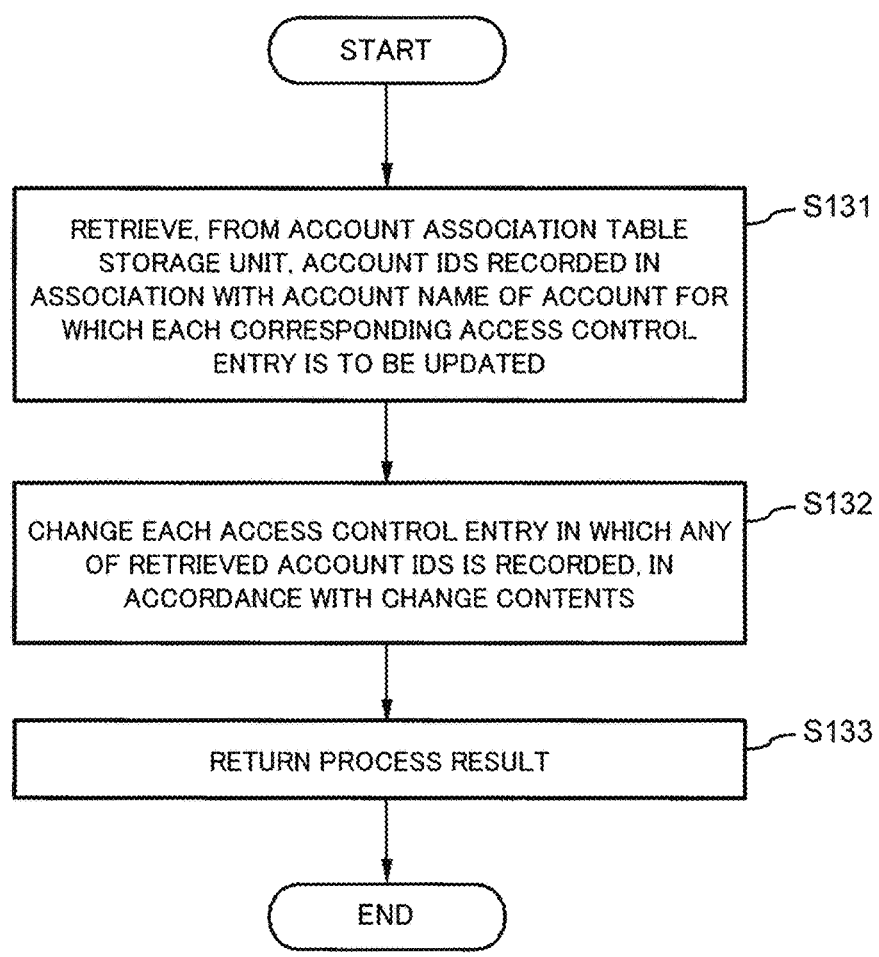
FIG. 13 is a flowchart illustrating an example of a process by an access control list change unit.

In response to the instruction, the access control list change unit 126 retrieves account IDs recorded in association with the account name 54 of the account for which each corresponding access control entry is to be changed, from the account association table storage unit 132 (Step S131 in FIG. 13), and changes the access control entry in which any of the retrieved account IDs is recorded, in accordance with the change contents 55 (Step S132). Thereafter, the access control list change unit 126 returns the process result to the access control unit 125 (Step S133).

Here, assume, for example, that the contents of the account association table storage unit 131 are those illustrated in FIG. 4A and the change target access control list is that illustrated in FIG. 11. In addition to these, assume, for example, that the account name 54 of the account for which each corresponding file access control entry is to be changed in the file access request is "B" and the change contents 55 for the access control list indicate "add an access control entry having READ as the access right". In this case, the access control list change unit 126 carries out the following process. In Step S131, the access control list change unit 126 retrieves the account IDs "IDB1" and "IDB2" recorded in association with the account name "B", from the account association table storage unit 132. In Step S132, an access control entry having the account ID "IDB1" and the access right "READ" and an access control entry having the account ID "IDB2" and the access right "READ" are added to the access control list. As a result of this, the contents of the access control list are changed to those illustrated in FIG. 14A.

Assume, for example, that the contents of the account association table storage unit 131 are those illustrated in FIG. 4A and the change target access control list is that illustrated in FIG. 14A. In addition to these, assume, for example, that the account name 54 of the account for which each corresponding file access control entry is to be changed in the file access request is "B" and the change contents 55 for the access control list indicate "change the access right to WRITE". In this case, the access control list change unit 126 carries out the following process. In Step S131, the access control list change unit 126 retrieves the account IDs "IDB1" and "IDB2" recorded in association with the account name "B", from the account association table storage unit 132. In Step S132, the access right in each access control entry including any of the account IDs "IDB1" and "IDB2" is changed to "WRITE". As a result of this, the contents of the access control list are changed to those illustrated in FIG. 14B.

Assume, for example, that the contents of the account association table storage unit 132 are those illustrated in FIG. 4A and the change target access control list is that illustrated in FIG. 14B. In addition to these, assume, for example, that the account name 54 of the account for which each corresponding access control entry is to be changed in the file access request is "B" and the change contents for the access control list indicate "delete an access control entry". In this case, the access control list change unit 126 carries out the following process. In Step S131, the access control list change unit 126 retrieves the account IDs "IDB1" and "IDB2" recorded in association with the account name "B", from the account association table storage unit 132. In Step S132, each access control entry having any of the account IDs "IDB1" and "IDB2" is deleted from the access control list. As a result of this, the contents of the access control list are changed to those illustrated in FIG. 14C.

When the process result returned from the access control list change unit 126 indicates failure (Step S1205), the access control unit 125 returns a response indicating process failure, to the node 4, which is the request source, (Step S1210) and thereafter terminates the process.

In contrast, when the process result returned from the access control list change unit 126 indicates success (Yes in Step S1205), the access control unit 125 determines whether or not the file access request received from the node 4 includes a process for the file main body (Step S1206). This determination is made on the basis of whether or not the file access request includes the "access contents 53 for the file main body".

When the file access request does not include the "access contents 53 for the file main body" (No in Step S1206), the access control unit 125 returns a response indicating process success, to the node 4, which is the request source, (Step S1209) and thereafter terminates the process. When the file access request includes the "access contents 53 for the file main body" (Yes in Step S1206), the access control unit 125 carries out the process based on the "access contents 53 for the file main body" in the file access request (Step S1207). Note that the process in Step S1207 is carried out even when the determination result in Step S1203 is No.

When the process is successful (Yes in Step S1208), the access control unit 125 returns a response indicating process success, to the node 4, which is the request source, (Step S1209) and thereafter terminates the process. In contrast, when the process fails (No in Step S1208), the access control unit 125 returns a response indicating process failure, to the node 4, which is the request source, (Step S1210) and thereafter terminates the process.

When receiving a response indicating process failure, the node 4 transmits the file access request to the node 1 again. When receiving a response indicating process failure a certain number of times in succession, the node 4 determines that the node 1 is facing failure, and carries out, for the node 2, the same process as that carried out for the node 1. This can increase the availability of file servers.

In the above-described exemplary embodiment, a file is used as the object for which access control is performed using an access control list. However, the object is not limited to this and may be a different object such as a folder. Moreover, in the above-described exemplary embodiment, the number of nodes functioning as file servers is two. However, the number of nodes may be three or more.

Effects of First Exemplary Embodiment

According to this exemplary embodiment, the following effect can be obtained: change operation can be facilitated even when an access control list of a file (object) accessible from multiple nodes by using the same account name is to be changed in a network system in which nodes individually manage accounts.

The reason is as follows. Upon input of a file access request including the account name of the account for which each corresponding access control entry is to be changed and change contents, the account IDs recorded in association with the account name are retrieved from the account association table storage unit, and each access control entry in which any of the retrieved account IDs is recorded among the account control entries in the change target access control list is changed in accordance with the change contents.

According to this exemplary embodiment, the effect of being able to easily create an account association table can be obtained.

The reason is as follows. Upon input of an account creation request including the account name of an account to be created, the first node generates an account ID that uniquely identifies the account to be created at the node itself, and stores, in association with each other, the generated account ID and the account name in the account creation request, in the account association table storage unit in the node itself. Upon receipt of an account association table registration request from the second node, the first node stores, in association with each other, the account ID and the account name included in the request, in the account association table storage unit in the node itself. Upon input of an account creation request including the account name of an account to be created, the second node generates an account ID that uniquely identifies the account to be created at the node itself, and transmits an account association table registration request including the account ID and the account name in the account creation request, to the node 1.

In addition to the above, according to this exemplary embodiment, the effect of providing a network system with enhanced availability can be obtained.

The reason is that the third node functioning as a client transmits a file access request to the first node when the first node is operating normally, and transmits a file access request to the second node when the first node is facing failure.

According to this exemplary embodiment, the effect of being able to automatically create an access control list of a file accessed from multiple nodes, at the time of creating the file can be obtained.

The reason is as follows. Upon receipt of a file registration request, the account IDs recorded in association with the account name of the file creator are retrieved from the account association table storage unit, and each access control entry in which any of retrieved account IDs and the preset access right are recorded in association with each other is created in the access control list of the registration target file.

Second Exemplary Embodiment

Next, a network system according to a second exemplary embodiment of the present invention is described.

Figure 15:
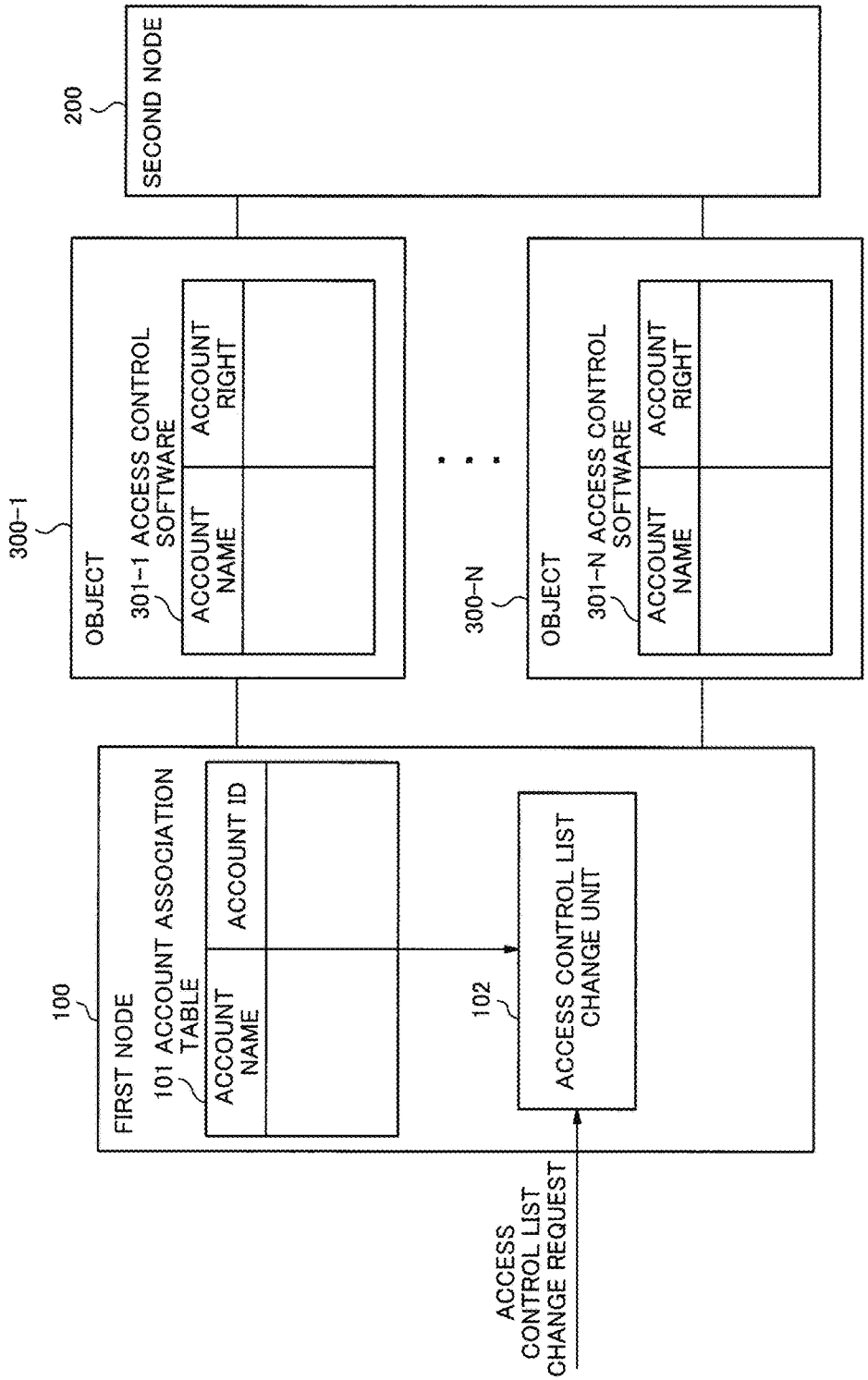
FIG. 15 is a block diagram illustrating an example of a configuration of a network system according to a second exemplary embodiment of the present invention.
Figure 16:
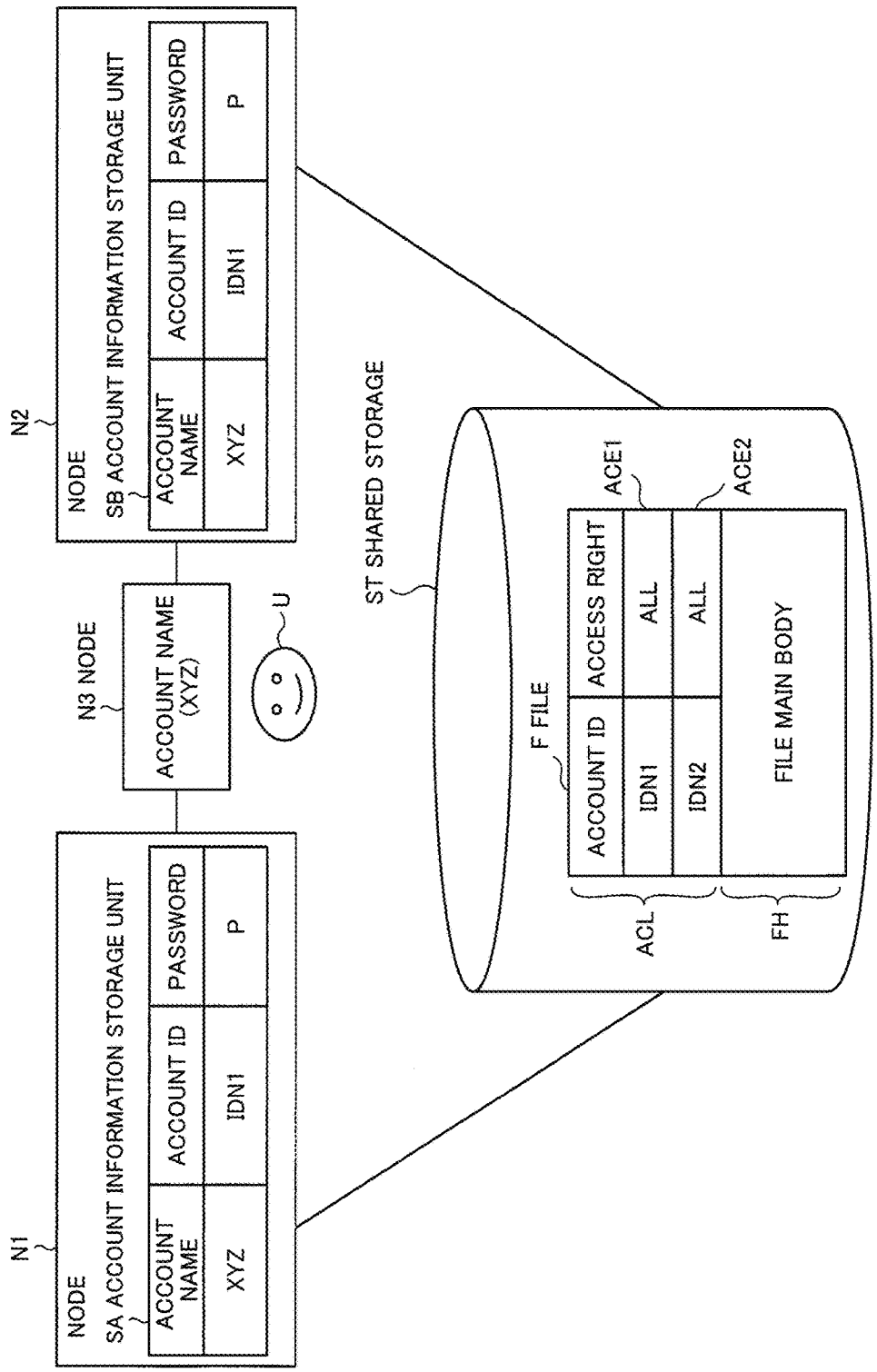
FIG. 16 is a diagram for illustrating a problem to be solved by the invention.

Referring to FIG. 15, a network system according to this exemplary embodiment includes a first node 100, a second node 200, and access control lists 301-1 to 301-N. The access control lists 301-1 to 301-N are access control lists of respective objects 300-1 to 300-N shared by the first node 100 and the second node 200, and each include access control entries in each of which the account ID and the access right of an account permitted to access the object is recorded.

The first node 100 includes an account association table 101 and an account control list change unit 102.

In the account association table 101, the account name and the account ID of each account created at the node 100 itself are recorded in association with each other, and the account name and the account ID of each account created at the second node 200 are recorded in association with each other.

In response to an access control list change request including identification information on an object the access control list of which is to be changed, the account name of the account for which each corresponding access control entry is to be changed, and change contents, the access control list change unit 102 retrieves the account IDs recorded in association with the account name in the access control list change request, from the account association table 101. Thereafter, the access control list change unit 102 changes each access control entry in which any of the retrieved account IDs is recorded and that is included in the access control list of the object indicated by the identification information, in accordance with the change contents.

Effects of Second Exemplary Embodiment

According to this exemplary embodiment, the following effect can be obtained: change operation can be facilitated even when an access control list of an object accessible from multiple nodes by using the same account name is to be changed in a network system in which nodes individually manage accounts.

The reason is as follows. Upon input of an access control list change request including the account name of the account for which each corresponding access control entry is to be changed and change contents, the account IDs recorded in association with the account name are retrieved from the account association table, and each access control entry in which any of the retrieved account IDs is recorded among the account control entries in the change target access control list is changed in accordance with the change contents.

The program described in the above exemplary embodiments and the like may be stored in a storage or recorded in a computer-readable recording medium. For example, the recording medium may be a portable medium such as a flexible disk, an optical disk, a magneto-optical disk, or a semiconductor memory.

The invention of the present application is described above by referring to the above-given exemplary embodiments. However, the invention of the present application is not limited to the above-described exemplary embodiments. Various changes that can be understood by those skilled in the art within the scope of the invention of the present application may be made to the configuration and details of the invention of the present application.

Note that the present invention is intended to benefit from the priority claim based on Japanese Patent Application No. 2013-016834 filed on Jan. 31, 2013 in Japan, the entire contents of which patent application are incorporated herein.

REFERENCE SIGNS LIST 1, 2, 4, 5 node
11, 21 transmission/reception unit
12, 22 control unit
121, 221 account management unit
122, 222 account association table management unit
123, 223 authentication unit
124, 224 file system
125, 225 access control unit
126, 226 access control list change unit
127, 227 file registration unit
13, 23 storage
131, 231 account information storage unit
132, 232 account association table storage unit
14, 24 input unit
15, 25 display unit
3 shared storage
31-1 to 31-N file
311 file metadata
312 access control list
313 file main body
100, 200 node
101 account association table
102 access control list change unit
300-1 to 300-N object
301-1 to 301-N access control list

What is claimed is:
1. A network system comprising:
a memory;
an account association table storage in which account IDs and account names are associated with each other;
a shared storage storing at least one object file to be accessed from nodes; and
an access control for unit, stored in the memory, for managing access rights to the at least one object file for associated account IDs, the access control unit being implemented by a computer processor;
wherein in response to receiving a request for changing the access rights to the at least one object file, the access control unit:
searches account IDs associated with an account name attached to the request in the account association table storage, and
when multiple account IDs associated with the account name are detected, changes the access rights associated with the detected account IDs at a time.

2. The network system according to claim 1, further comprising:
an account management unit, stored in the memory, for receiving an account association table registration request including an account ID and an account name, and registering the account ID and the account name in the account association table storage.

3. The network system according to claim 1, further comprising:
the access control unit for sending an access request to access to an object file in the shared storage.

4. The network system according to claim 1, further comprising:
a file registration unit, stored in the memory, that, in response to a file registration request, registers a registration target file in the shared storage, and creates an access control entry in an access control list of the registration target file.

5. An access control list change method for a network system, the network system comprising an account association table storage in which account IDs and account names are associated with each other, and a shared storage storing at least one object file to be accessed from nodes, the access control list change method comprising:
managing access rights to the at least one object file for associated account IDs;
wherein in response to receiving a request for changing access rights to the at least one object file, the method further comprises:
searching account IDs associated with an account name attached to the request in the account association table storage, and
when multiple account IDs associated with the account name are detected, changing the access rights associated with the detected account IDs at a time.

6. A non-transitory computer readable storage medium recording thereon a program, causing a computer to run the program to:
refer to an account association table storage in which account IDs and account names are associated with each other, and a shared storage storing at least one object file to be accessed from nodes; and
manage access rights to the at least one object file for associated account IDs;
wherein in response to receiving a request for changing the access rights to the at least one object file, the computer runs the program to:
search account IDs associated with an account name attached to the request in the account association table storage, and
when multiple account IDs associated with the account name are detected, change the access rights associated with the detected account IDs at a time.

* * * * *